(12) United States Patent
Abe

(10) Patent No.: US 6,700,609 B1
(45) Date of Patent: Mar. 2, 2004

(54) CLAMPING DEVICE AND CLAMPING METHOD

(75) Inventor: Miki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/600,456

(22) PCT Filed: Nov. 17, 1999

(86) PCT No.: PCT/JP99/06407

§ 371 (c)(1),
(2), (4) Date: Jul. 17, 2000

(87) PCT Pub. No.: WO00/31967

PCT Pub. Date: Jun. 2, 2000

(30) Foreign Application Priority Data

Nov. 19, 1998 (JP) .............................. 10-329218

(51) Int. Cl.[7] .......................... H04N 9/64; H04N 5/217; H04N 5/228; H04N 1/40
(52) U.S. Cl. ..................... 348/243; 348/241; 348/222.1; 358/448
(58) Field of Search ................................ 348/243, 241, 348/222.1; 358/448, 461, 463

(56) References Cited

U.S. PATENT DOCUMENTS 5,105,276 A * 4/1992 Schrock ....................... 348/241
5,189,528 A * 2/1993 Takashima et al. .......... 358/448
5,659,355 A    8/1997 Barron et al.
5,930,401 A * 7/1999 Morishige et al. .......... 382/274
6,084,634 A * 7/2000 Inagaki et al. ............... 348/243
6,304,292 B1 * 10/2001 Ide et al. ..................... 348/243

FOREIGN PATENT DOCUMENTS

| JP | 59-181877 | 10/1984 |
| JP | 63-169882 | 7/1988 |
| JP | 7-193755 | 7/1995 |
| JP | 11-88776 | 3/1999 |

* cited by examiner

*Primary Examiner*—Andrew Christensen
*Assistant Examiner*—Nhan T Tran
(74) *Attorney, Agent, or Firm*—Frommer Lawrence & Haug LLP; William S. Frommer

(57) ABSTRACT

An optical black portion in an output of a CCD image pickup device is extracted and a clamp level of each line is obtained by an integrating and averaging circuit. A difference value of the clamp levels between the front and rear lines and an absolute value of the difference are calculated by a comparing circuit. Either the clamp level of each line or the clamp level updated every (+1) or (−1) is selected by a selector in accordance with whether the absolute value of the difference of the clamp levels between the front and rear lines lies within a predetermined range or not. The clamp level which is outputted from the selector is subtracted from the output of the CCD image pickup device.

3 Claims, 4 Drawing Sheets

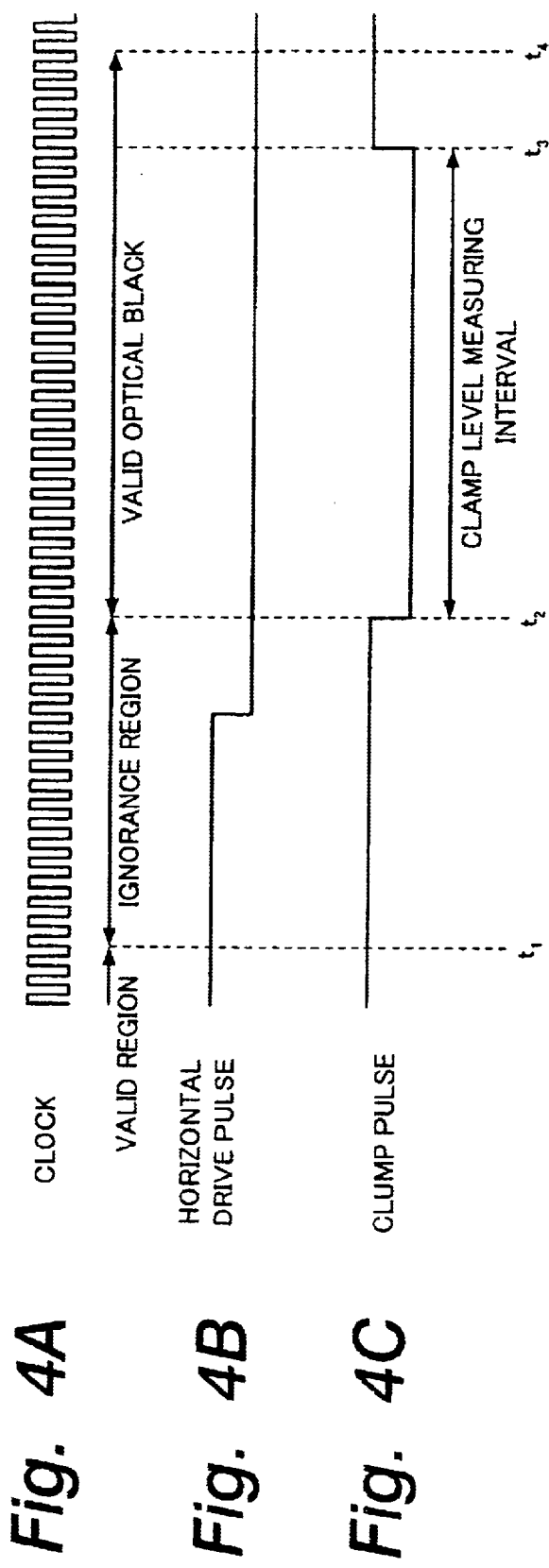

CLAMPING DEVICE AND CLAMPING METHOD

TECHNICAL FIELD

The invention relates to a clamping apparatus and a clamping method which are suitable when they are used to clamp an output of an optical black portion in an image pickup output of a CCD image pickup device to a black level in, for example, a digital still camera, a digital video camera, or the like.

BACKGROUND ART

In a video camera, a CCD (Charge Coupled Device) image pickup device is used as an image pickup device. Not only a photoelectric conversion output which is caused when the light is irradiated onto a photosensing surface of the CCD image pickup device but also a component of a dark current which is caused when no light is irradiated are included in an output of the CCD image pickup device. Therefore, an optical black portion is provided for the CCD image pickup device and a process for setting an output of the optical black portion to a black level is performed.

That is, a masking region 21 is provided for the CCD image pickup device as shown in FIG. 1. The masking region 21 is perfectly shielded against the light and the portion of the masking region 21 becomes an optical black. A signal of the masking region 21 is outputted as an optical black portion from the CCD image pickup device at a head timing of every line. Only a component of the dark current is outputted from the optical black portion. A clamp level is obtained from the output of the optical black portion. The clamp level formed by extracting the optical black portion is subtracted from the image pickup output of the CCD image pickup device. Thus, the optical black portion in the output of the CCD image pickup device is clamped so as to be set to the black level (namely, 0 level). Thus, the dark current is removed and only the photoelectric conversion output can be extracted.

Hitherto, the clamping circuit for setting the optical black portion in the output of the CCD image pickup device to the black level has such a construction that the clamp level is obtained from a signal of an optical black portion in an output of a CCD image pickup device 102 by a microcomputer 106 for a camera as shown in FIG. 2.

In FIG. 2, reference numeral 101 denotes a lens portion. The lens portion 101 has a zoom lens, a focusing lens, an aperture mechanism, its driving circuit, and the like. An image pickup portion is constructed by the lens portion 101 and CCD image pickup device 102. Object image light transmitted through the lens portion 101 is formed as an image onto a photosensing surface of the CCD image pickup device 102.

As shown in FIG. 1, the masking region 21 serving as an optical black portion is provided for the CCD image pickup device 102. The output of the CCD image pickup device 102 is supplied to a sample and hold and AGC circuit 103. The output of the CCD image pickup device 102 is sampled and held and amplified to a predetermined level by the sample and hold and AGC circuit 103. An output of the sample and hold and AGC circuit 103 is supplied to an A/D converting circuit 104. The image pickup signal of the CCD image pickup device 102 is converted into a digital signal by the A/D converting circuit 104.

An output of the A/D converting circuit 104 is supplied to a subtractor 107 and supplied to a detecting circuit 105. A clamp pulse for extracting an optical black level (namely, masking region 21) in the head portion of each line is supplied to the detecting circuit 105 from an input terminal 110. The head optical black level of each line is extracted by the detecting circuit 105 and its level is detected. The head optical black level is supplied to the microcomputer 106.

The microcomputer 106 integrates detection results of the optical black levels of a plurality of lines and calculates an average clamp level. The average clamp level calculated by the microcomputer 106 is supplied to the subtractor 107. In the subtractor 107, the clamp level obtained by the microcomputer 106 is subtracted from the output of the A/D converting circuit 104. Thus, the optical black level of the CCD image pickup device 102 is clamped to "0".

An output of the subtractor 107 is supplied to a luminance signal separating circuit 108 and a chroma signal separating circuit 109 of a camera signal processing circuit 114. In the luminance signal separating circuit 108, a luminance signal is separated and a process for the luminance signal is performed. An output of the luminance signal separating circuit 108 is outputted from an output terminal 111. In the chroma signal separating circuit 109, a chroma signal is separated and a process for the chroma signal is performed. An output of the chroma signal separating circuit 109 is outputted from an output terminal 112.

As mentioned above, hitherto, the detecting circuit 105 extracts the optical black portions of a plurality of lines and detects their levels. In the microcomputer 106, the average clamp level is calculated from the detection results of the optical black levels of a plurality of lines. In the subtractor 107, the clamp level formed by averaging the detection results of the optical black levels of a plurality of lines is subtracted from the output of the CCD image pickup device 102. In this manner, the clamping circuit is constructed.

However, when the microcomputer 106 obtains the clamp level as mentioned above, the processes of the microcomputer 106 are occupied for such a period of time and become a burden when the other processes are executed by the microcomputer 106.

It is, therefore, considered that the clamping circuit for setting the level of the optical black portion of the CCD image pickup device 102 to the black level is constructed by hardware. In this case, it is possible to construct so as to calculate the clamp level by using the detection result of the optical black level of each line. By using such a construction, the clamp level fluctuates every line and a problem of the occurrence of a line flicker occurs. It is, therefore, necessary to obtain the clamp level by averaging the detection results of the optical black levels of a plurality of lines. However, to average the detection results of the optical black levels of a plurality of lines, a circuit for storing the optical black levels of respective lines and averaging those levels is necessary, so that the circuit scale increases.

It is, therefore, an object of the invention to provide a clamping apparatus and a clamping method which can solve the above problems.

DISCLOSURE OF INVENTION

To solve the above problems, according to the invention, there is provided a clamping apparatus comprising: a circuit for masking a part of a solid state image pickup device and photoelectrically converting a signal of a dark current component which is outputted from the solid state image pickup device and corresponds to a masking portion and a photo-signal which is outputted from the solid state image pickup device and corresponds to a non-masking portion; an integrating portion for sampling and integrating the dark current component signal corresponding to the masking portion every line; an averaging portion for averaging an integration value which is obtained by the integrating portion; a comparing portion for comparing an average value of each line averaged by the averaging portion, thereby detecting a change state of the average value; a clamp level control portion for holding the average value when a comparison result of the comparing portion lies within a predetermined range and changing the average value so as to have a predetermined gradation when the comparison result of the comparing portion is out of the predetermined range; and a subtracting portion for subtracting the average value derived from the clamp level control portion from an output of the photoelectric converting circuit, wherein the signal is clamped on the basis of the signal of the dark current component that is outputted from the solid state image pickup device.

BRIEF DESCRIPTION OF DRAWINGS

FIG. 4A is a waveform diagram for explaining a sampling clock in the embodiment; FIG. 4B is a waveform diagram for explaining a horizontal drive pulse signal in the embodiment; and FIG. 4C is a waveform diagram for explaining a clamp pulse in the embodiment.

BEST MODE FOR CARRYING OUT THE INVENTION

Figure 1:
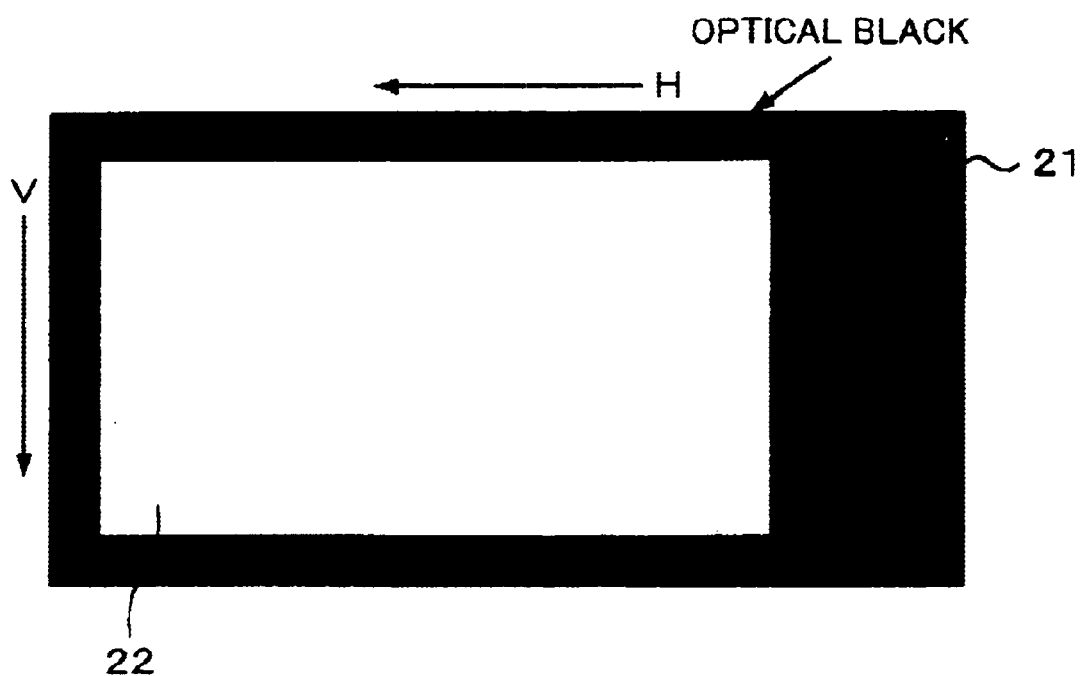
FIG. 1 is an explanatory diagram of a masking region of a CCD image pickup device.
Figure 2:
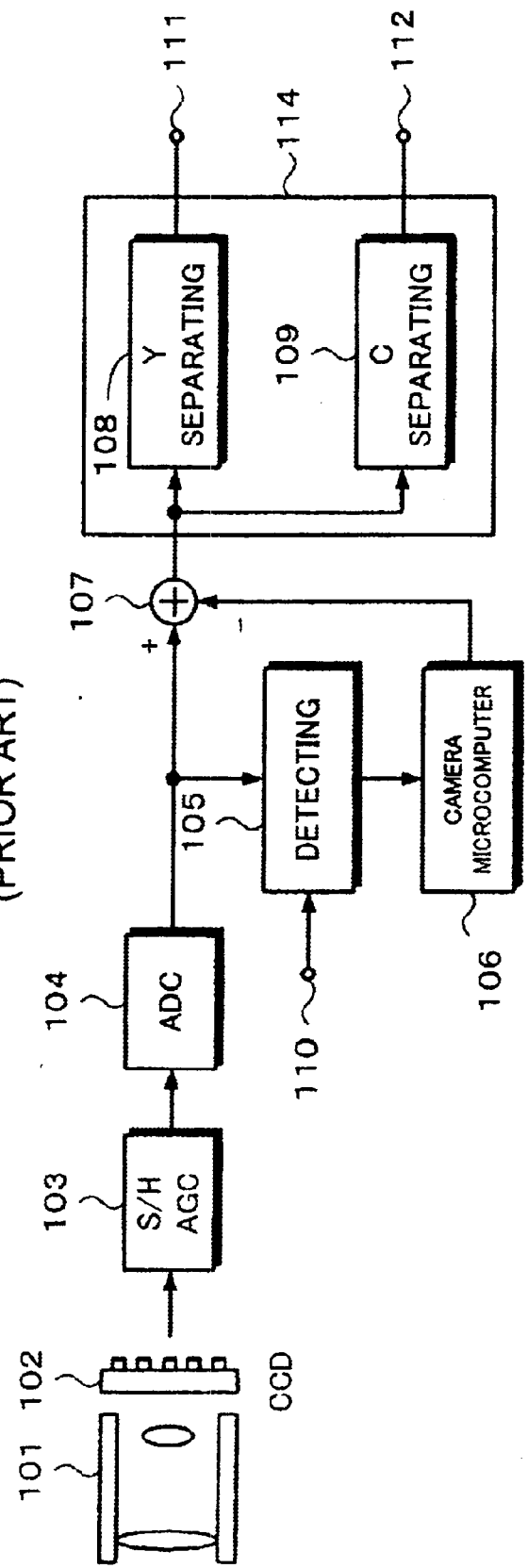
FIG. 2 is a block diagram for explaining a conventional clamping circuit.
Figure 3:
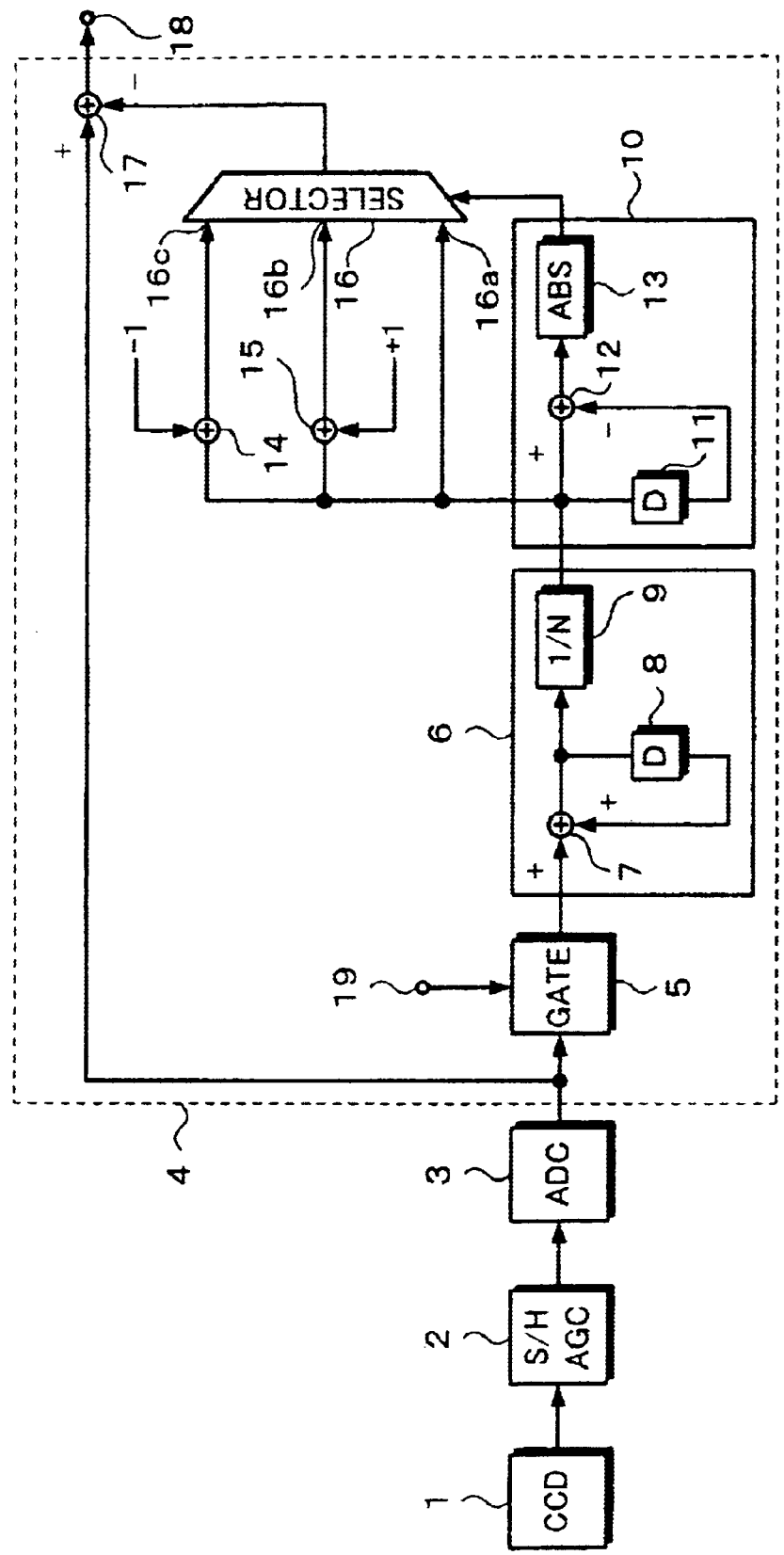
FIG. 3 is a block diagram showing a whole construction of an embodiment.

An embodiment of the invention will now be described hereinbelow with reference to the drawings. In FIG. 3, reference numeral 1 denotes a CCD image pickup device. A masking region set to an optical black level is provided for the CCD image pickup device 1. Object image light is formed as an image onto the photosensing surface of the CCD image pickup device 1. An output of the CCD image pickup device 1 is supplied to a sample and hold and AGC circuit 2.

In the sample and hold and AGC circuit 2, the output of each CCD image pickup device 1 is sampled and held and amplified to a predetermined level. An output of the sample and hold and AGC circuit 2 is supplied to an A/D converting circuit 3. In the A/D converting circuit 3, in case of the NTSC system, an input signal is quantized by 4 fsc (fsc denotes a color subcarrier frequency: 3.58 MHz) and a digital image pickup signal of, for example, 10 bits per sample is formed. The digital image pickup signal formed by the A/D converting circuit 3 is supplied to a subtractor 17 of a clamping circuit 4 and supplied to a gate circuit 5.

The clamping circuit 4 clamps an output of an optical black portion of the CCD image pickup device 1 to a black level. The clamping circuit 4 is constructed by the gate circuit 5, an integrating and averaging circuit 6, a comparing circuit 10, a subtractor 14, an adder 15, a subtractor 17, and a selector 16.

A clamp pulse is supplied to the gate circuit 5 from an input terminal 19. The clamp pulse is generated in the optical black portion of the CCD image pickup device 1. The optical black portion in the output of the CCD image pickup device 1 is extracted by the gate circuit 5.

The integrating and averaging circuit 6 is constructed by an adder 7, a delay circuit 8, and a 1/N multiplier 9. An output of the gate circuit 5 is supplied to the adder 7. An output of the adder 7 is supplied to the adder 7 via the delay circuit 8 and integrated. This integration output is supplied to the 1/N multiplier 9 and averaged. The integrating and averaging circuit 6 averages the output, every line, corresponding to the optical black portion in the output of the CCD image pickup device 1 extracted by the gate circuit 5, thereby obtaining the clamp level of each line.

The comparing circuit 10 is constructed by a subtractor 12, a delay circuit 11, and an absolute value circuit 13. The comparing circuit 10 calculates an absolute value of a difference of the clamp levels between the front and rear lines. An output of the integrating and averaging circuit 6 is supplied to the subtractor 12 and delayed by the delay circuit 11 and supplied to the subtractor 12. The difference of the clamp levels between the front and rear lines is obtained by the subtractor 12. An output of the subtractor 12 is supplied to the absolute value circuit 13 and the absolute value of the difference of the clamp levels between the front and rear lines is obtained by the absolute value circuit 13. A control signal to the selector 16 is formed by whether the absolute value of the difference of the clamp levels between the front and rear lines lies within a predetermined range or not.

The selector 16 has three input terminals 16a, 16b, and 16c. The clamp level of each line from the integrating and averaging circuit 6 is supplied as it is to the input terminal 16a of the selector 16. The clamp level of each line to which "1" has been added is supplied to the input terminal 16b. The clamp level of each line from which "1" has been subtracted is supplied to the input terminal 16c. The selector 16 selects one of the inherent clamp level of each line, the clamp level of each line to which "1" has been added, and the clamp level of each line from which "1" has been subtracted on the basis of an output of the comparing circuit 10.

As shown in FIG. 4C, the portion corresponding to the optical black in the output of the CCD image pickup device 1 is extracted by the gate circuit 5 in response to the clamp pulse from the input terminal 19.

That is, as shown in FIGS. 4A and 4C, the output before time $t_1$, in the output of the CCD image pickup device 1 corresponds to a valid region of the previous line, the output within a range from time $t_1$ to time $t_2$ corresponds to an ignorance region, and the output within a range from time $t_2$ to time $t_4$ corresponds to a region of the optical black. FIG. 4A shows a sampling clock. FIG. 4B shows a horizontal drive pulse signal. FIG. 4C shows a clamp pulse. As shown in FIG. 4C, the clamp pulse is generated within a range from time $t_2$ to time $t_3$ in the optical black. The signal within this range from time $t_3$ to time $t_3$ is extracted by the gate circuit 5.

The clamp levels are averaged by the integrating and averaging circuit 6 for a period of time within the range from time $t_2$ to time $t_3$ in the optical black. Thus, the clamp level clamp[n] of each line is obtained.

The clamp level clamp[n] of each line which is outputted from the integrating and averaging circuit 6 is supplied to the input terminal 16a of the selector 16 as it is. "1" is added to the clamp level clamp[n] by the adder 15 and a resultant level is supplied to the input terminal 16b. "1" is subtracted from the clamp level clamp[n] by the subtractor 14 and a resultant level is supplied to the input terminal 16c. The clamp level clamp[n] of each line which is outputted from the integrating and averaging circuit 6 is supplied to the comparing circuit 10.

The comparing circuit 10 calculates a difference value diff of the clamp levels between the front and rear lines. The comparing circuit 10 calculates an absolute value abs of the difference of the clamp levels between the front and rear lines. The absolute value abs is compared with a predetermined specified value m, thereby forming a control signal to the selector 16.

Specifically speaking, the absolute value abs is calculated by the absolute value circuit 13 from the difference diff of the clamp levels between the front and rear lines. The absolute value abs of the difference diff of the clamp levels is obtained by the following equation (1).

$$\text{abs} = |\text{clamp}[n+1] - \text{clamp}[n]| \quad (1)$$

In the absolute value circuit 13, the absolute value abs is compared with the specified value m.

When there is a relation (abs≦m) between the absolute value abs and the specified value m, the input terminal 16a is selected. In this instance, the clamp level is not updated but the clamp level clamp[n] of each line which is outputted from the integrating and averaging circuit 6 is supplied as it is to the subtractor 17 via the selector 16.

When there is a relation (abs>m) between the absolute value abs and the specified value m and when the difference diff of the clamp levels is (diff>0), the input terminal 16b is selected. In this instance, "1" is added by the adder 15 to the clamp level clamp[n] of each line which is outputted from the integrating and averaging circuit 6 and a resultant level is supplied as it is to the subtractor 17 via the selector 16.

Further, when there is a relation (abs>m) between the absolute value abs and the specified value m and when the difference diff of the clamp levels is (diff<0), the input terminal 16c is selected. In this instance, the clamp level is not updated but "1" is subtracted by the subtractor 14 to the clamp level clamp[n] of each line which is outputted from the integrating and averaging circuit 6 and a resultant level is supplied as it is to a subtracting terminal of the subtractor 17 via the selector 16.

As mentioned above, the clamp level of each line which is outputted from the integrating and averaging circuit 6 is used as it is if the absolute value of the difference of the clamp levels between the front and rear lines lies within the predetermined range, and if the absolute value exceeds the predetermined range, the clamp level is updated every (+1) or (−1). Thus, the optimum clamp level is outputted from the output of the selector 16.

The output of the selector 16 is supplied to the subtractor 17. The output of the selector 16 is subtracted from the output of the A/D converting circuit 3 by the subtractor 17. Thus, the clamping process is executed so as to set the optical black portion of the CCD image pickup device 1 to the 0 level.

As mentioned above, in the embodiment of the invention, whether the absolute value of the difference of the clamp levels between the front and rear lines lies within the predetermined range or not is discriminated. If the absolute value of the difference of the clamp levels between the front and rear lines lies within the predetermined range, the clamp level is used as it is. If the absolute value is larger than the predetermined range, the clamp level is updated every (+1) or (−1), so that the clamp level is raised or dropped. Therefore, even if there is a fluctuation in the clamp level of each line, the clamp level does not suddenly fluctuates. Therefore, no line flicker occurs in spite of the fact that the clamp level of each line is used.

The invention can be easily applied to another clamping circuit of a video signal such as pedestal clamp, sync chip clamp, or the like.

Although the embodiment of the invention has been described with respect to the case of the construction by the hardware, the clamp circuit can be realized by software.

Further, although the embodiment of the invention has been described with respect to the construction in which "−1" is added to the averaged clamp level by the subtractor 14 at the front stage of the selector 16 and "+1" is added to the averaged clamp level by the adder 15, a change width can be set as necessary. The change width can be also automatically varied on the basis of control information of the comparing circuit 10.

According to the invention, the clamp level of each line is obtained from the signal of the optical black portion of the CCD image pickup device every line, and on the basis of whether the absolute value of the difference of the clamp levels between the front and rear lines lies within the predetermined range or not, either the clamp level of each line or the clamp level updated every (+1) or (−1) is selected. Therefore, in the case where the fluctuation of the clamp level of each line is small, the clamp level does not fluctuate. Even if the clamp level fluctuates, it is changed gradually every (+1) or (−1). Therefore, in spite of the fact that the clamp level of each line is used, no line flicker occurs. Since the clamp level of each line is used, there is no need to average the clamp levels of a plurality of lines and the invention can be realized by simple hardware.

INDUSTRIAL APPLICABILITY

As mentioned above, the clamping apparatus and clamping method according to the invention are suitable when they are used to clamp the output of the optical black portion in the image pickup output of the CCD image pickup device to the black level, for example, in the digital still camera, digital video camera, or the like.

What is claimed is:

1. A clamping apparatus comprising:

means for masking a part of a solid state image pickup device and photoelectrically converting a signal of a dark current component which is outputted from said solid state image pickup device and corresponds to a masking portion and a photosignal which is outputted from said solid state image pickup device and corresponds to a non-masking portion;

integrating means for sampling and integrating said dark current component signal corresponding to said masking portion every line;

averaging means for averaging an integration value which is obtained by said integrating means;

comparing means for comparing an average value of each line averaged by said averaging means, thereby detecting a change state of said average value;

clamp level control means for holding the average value when a comparison result of said comparing means lies within a predetermined range and changing the average value so as to have a predetermined gradation when said comparison result of said comparing means is out of said predetermined range; and subtracting means for subtracting said average value derived from said clamp level control means from an output of said photoelectric converting means, wherein the signal is clamped on the basis of the signal of the dark current component that is outputted from said solid state image pickup device.

2. An apparatus according to claim 1, further comprising setting means which can arbitrarily set said predetermined gradation at a time when said average value is changed by said clamp level control means.

3. A clamping method comprising the steps of:

masking a part of a solid state image pickup device and photoelectrically converting a signal of a dark current component which is outputted from said solid state image pickup device and corresponds to a masking portion and a photosignal which is outputted from said solid state image pickup device and corresponds to a non-masking portion;

sampling and integrating said dark current component signal corresponding to said masking portion every line;

averaging an integration value;

comparing an average value of each line, thereby detecting a change state of said average value;

holding the average value when a comparison result lies within a predetermined range and changing the average value so as to have a predetermined gradation when said comparison result is out of said predetermined range; and subtracting said average value changed so as to have said predetermined gradation from said photoelectrically converted output, wherein the signal is clamped on the basis of the signal of the dark current component that is outputted from said solid state image pickup device.

* * * * *